United States Patent
Kagaya

(10) Patent No.: US 7,602,538 B2
(45) Date of Patent: Oct. 13, 2009

(54) METHOD AND APPARATUS FOR IMAGE DATA PROCESSING

(75) Inventor: Makoto Kagaya, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1120 days.

(21) Appl. No.: 10/465,660

(22) Filed: Jun. 20, 2003

(65) Prior Publication Data

US 2003/0235343 A1     Dec. 25, 2003

(30) Foreign Application Priority Data

Jun. 25, 2002  (JP) ............................. 2002-184447

(51) Int. Cl.
   *G06K 15/00* (2006.01)
(52) U.S. Cl. ...................... 358/521; 358/520; 358/3.27; 382/166; 382/167
(58) Field of Classification Search ................ 358/448, 358/1.9, 518, 521, 520, 531, 532, 2.1, 3.26, 358/3.27, 447, 463, 302; 382/162, 164, 166, 382/167, 274, 260, 263, 264, 266; 348/235, 348/223, 234
See application file for complete search history.

(56) References Cited

U.S. PATENT DOCUMENTS

| | | | | |
|---|---|---|---|---|
| 5,189,511 A * | 2/1993 | Parulski et al. | ............... | 358/518 |
| 5,321,531 A * | 6/1994 | Hasebe et al. | ................ | 358/538 |
| 6,343,158 B1 * | 1/2002 | Shiohara | .................... | 382/264 |
| 6,603,878 B1 * | 8/2003 | Takemoto | .................... | 382/167 |
| 6,640,017 B1 * | 10/2003 | Tsai et al. | .................... | 382/266 |
| 6,690,418 B1 * | 2/2004 | Terasawa et al. | ............ | 348/235 |
| 6,697,534 B1 * | 2/2004 | Tan et al. | .................... | 382/266 |
| 6,965,416 B2 * | 11/2005 | Tsuchiya et al. | ............ | 348/606 |
| 7,065,257 B2 * | 6/2006 | Soga et al. | ................... | 382/274 |
| 7,072,509 B2 * | 7/2006 | Hunter et al. | ................ | 382/167 |
| 7,082,218 B2 * | 7/2006 | Pollard et al. | ................ | 382/167 |
| 7,092,122 B2 * | 8/2006 | Iwaki | ......................... | 358/520 |
| 7,092,965 B2 * | 8/2006 | Easwar | ....................... | 382/232 |
| 7,308,152 B2 * | 12/2007 | Ito | ............................. | 382/260 |
| 2002/0041331 A1 * | 4/2002 | Xiaomang et al. | .......... | 348/234 |
| 2002/0080379 A1 * | 6/2002 | Iwaki | ......................... | 358/1.13 |
| 2003/0053159 A1 * | 3/2003 | Ito | ............................. | 358/518 |
| 2004/0252907 A1 * | 12/2004 | Ito | ............................. | 382/260 |
| 2005/0013506 A1 * | 1/2005 | Yano | .......................... | 382/274 |
| 2005/0286798 A1 * | 12/2005 | Pollard et al. | .............. | 382/274 |
| 2007/0038578 A1 * | 2/2007 | Liu et al. | ..................... | 705/62 |

FOREIGN PATENT DOCUMENTS

| | | |
|---|---|---|
| JP | 06-030330 | 2/1994 |
| JP | 10-285409 | 10/1998 |

* cited by examiner

*Primary Examiner*—Kimberly A Williams
(74) *Attorney, Agent, or Firm*—Sughrue Mion, PLLC

(57) ABSTRACT

An image data processing method and apparatus for performing image correction processes for a restored image data file obtained from a JPEG-compressed image data file which may prevent block distortions and provide a high quality image.

A JPEG-compressed data file is read from the storage medium by the reading section, which is restored at the restoring section. The restored data is then split into a low-frequency component and a high-frequency component at the splitting section. The low-frequency component is subjected to the white balance, density, and gradation adjustments at the first image correction processing section and combined with the high-frequency component at the combining section to obtain a combined image data. The combined image data is then subjected to the sharpness adjustment at the sharpness adjusting section, which is outputted from the output section to a printer and reproduced as a printed image.

4 Claims, 2 Drawing Sheets

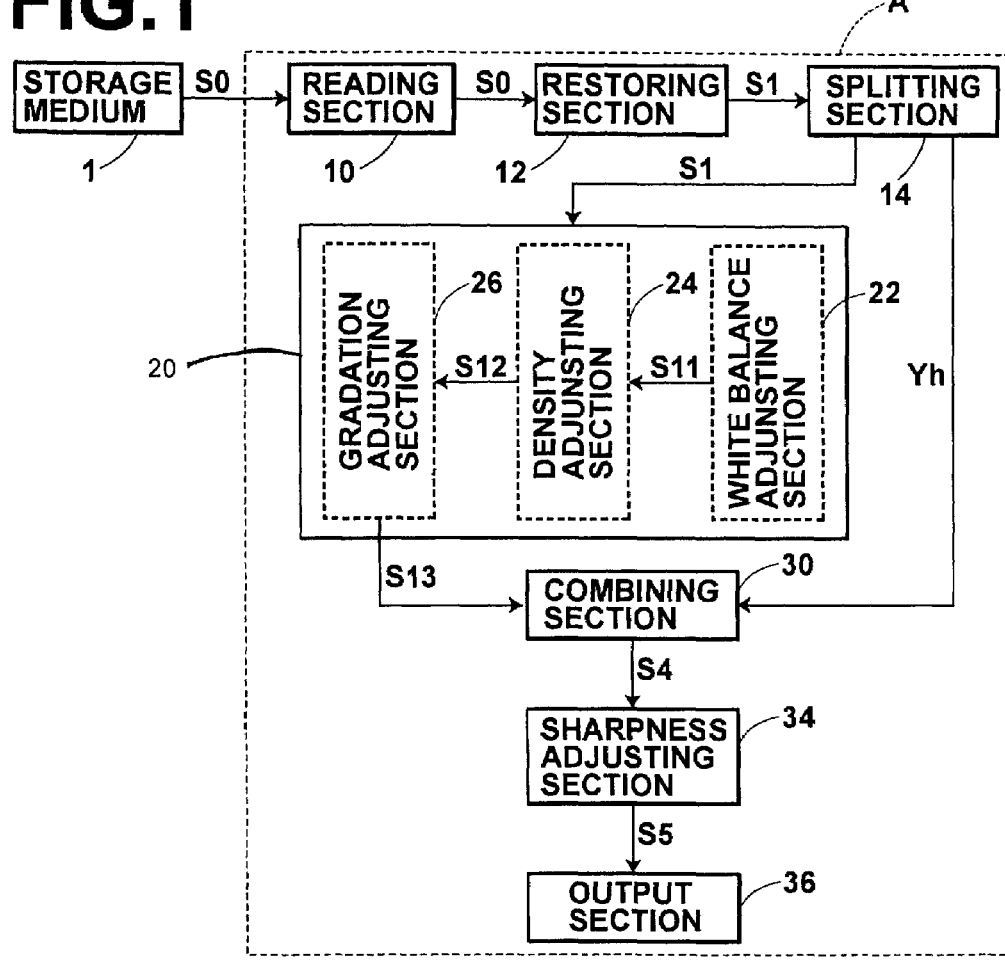
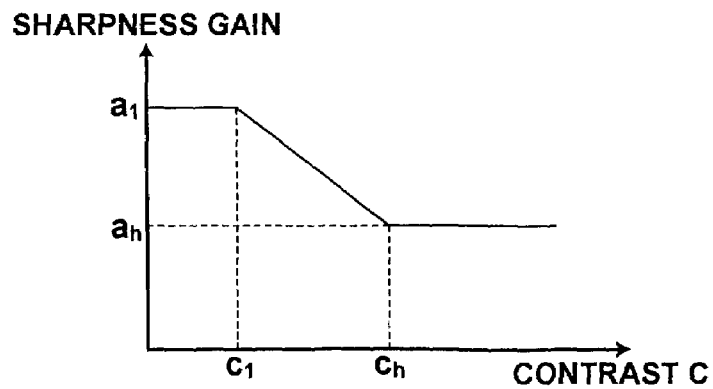

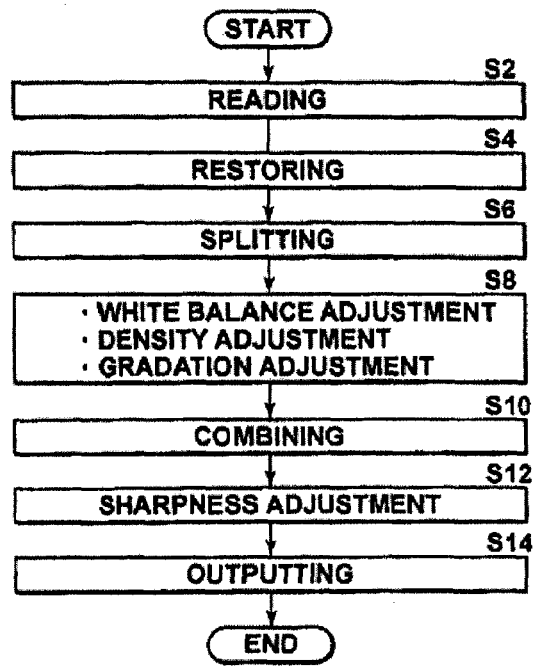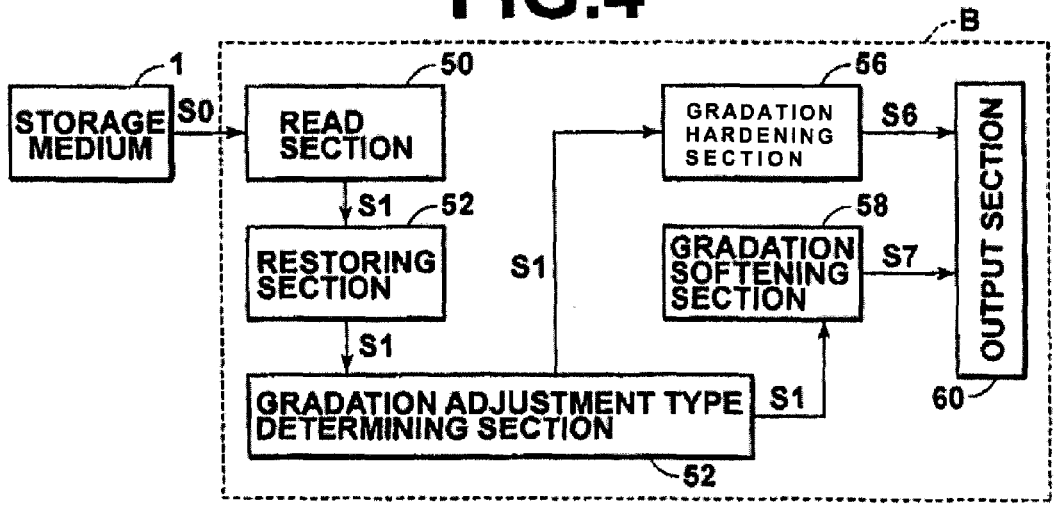

METHOD AND APPARATUS FOR IMAGE DATA PROCESSING

BACKGROUND OF THE INVENTION

1. Field of the invention

The present invention relates to an image data processing method and apparatus for performing image correction processes for a restored image data file obtained by restoring a compressed image data file.

2. Description of the Related Art

A variety of systems that provide various services for digital image data (hereinafter referred to as "image data") have emerged in recent years. Examples such as an image data storage and management service system, in which the image data obtained by scanning a negative film, or through a digital camera is stored and managed, and a printing service system, in which image correction processes are performed on image data to obtain an image with desirable image quality before printing, are available today.

In the meantime, most of the systems described above provide services through a network or networks accompanying the rapid popularization of the Internet due to the price reduction of the terminal devices including computers, and the advancement of network technology.

For example, the printing service system described above is configured to print out an image at a printer located, e.g., in a mini-laboratory connected through a network or networks after performing image correction processes on an image data file uploaded to the server from the user terminal, or to store the processed image data in a server with only address information that indicates the location of the file, such as URL, being sent to the lab so that the lab may download the file thereto for printing when such a request is received. In both cases, the delivery of the image data file from the user terminal to the server, or from the server to the printer for printing the image is performed through a network or networks.

In the field of mobile communications, image processing services focusing on personal digital assistants (PDA) are actively being performed along with the popularization and increased features of the PDA, such as cellular phones. Some communication exchange servers, for example, have image correction processing functions, including gradation, white balance, density, and sharpness adjustments, and when relaying an e-mail message between two PDA's, an image data file attached to the message sent from the transmitting PDA is processed by these functions before being sent to the receiving PDA, or the processed file is stored in the server with only address information that indicates the location of the file, such as URL, being sent to the receiving PDA if the PDA cannot receive the attached file, which will be downloaded thereto at a later time when such a request is received. These servers also receive or transmit image data files to PDAs through a network or networks.

These image data files are generally delivered through a network or networks as a compressed image data file in order to reduce the burdens on the terminals and the networks including the reduction in the transmission time. For PDAs, including cellular phones, a particularly tight capacity restriction is imposed and the image data file obtained by photography is stored into the storage section of the device after being highly compressed, since most of these image data files will be sent to other PDAs or computers.

Mainly because of the background and the capacity restriction imposed on the storage medium for storing image data files described above, the image data obtained through a digital camera by photographing a subject, or by reading a film with a scanner or similar devices is usually stored in a storage medium as a compressed image data file.

Thus, most of the image data files inputted to an image data processing apparatus are compressed image data files, and the apparatus will perform the image correction processes after restoring (decompressing) the files. The image correction processes include gradation, white balance, density, and other adjustments. For the gradation adjustment, it is customary that the tonal range or gradation of an image is coarsely or sharply graded to obtain a high contrast image (gradation hardening operation).

Although variety of image data compression technologies are available, including JPEG, GIF, and TIFF, JPEG (including MPEG, a compression technology for animated images based on JPEG, which will apply hereinafter also) is most widely used as the world standard technology for image data compression. In particular, it is being accepted as the common image data compression technology for computers, television, or other media that involve image data processing. JPEG is the image data compression method which is made up of discrete cosine transform, quantization, encoding, and other processing for each image data block. In general terms, however, it is a method based on the frequency characteristic of an image data file, in which a low-frequency component is finely sampled, while the high-frequency component, which is not readily perceivable to human eyes, is more coarsely sampled to obtain a compressed image data file.

The compression technologies described above, including JPEG, are more likely to degrade the image quality as the compression ratio is increased, though in varying degrees depending on the technology used, and the block distortions or artifacts developed in a restored image data file are considered to be an unavoidable price for reducing the size of the image data file. When performing image correction processes, e.g., a gradation adjustment to a compressed image data file, if the adjustment is implemented to a compressed data file having a high compression ratio by setting the image data processing apparatus with a gradation hardening level which is appropriate for an image data file having a low compression ratio and is able to reproduce a comparatively high quality image, the block distortions are further highlighted in the reproduced image, in particular, in the high-frequency component areas, further degrading the image quality.

Similar problems are also found in other image correction processes such as a white balance, density, or other adjustments.

SUMMARY OF THE INVENTION

The present invention has been developed in recognition of the circumstance described above, and it is an object of the present invention to provide an image data processing method and apparatus capable of performing image correction processes for a restored image data file obtained by restoring a compressed image data file compressed by JPEG or other data compression technologies without any appreciable degradation to the image quality.

A first image data processing method of the present invention is an image data processing method for performing image correction processes for a restored image data file obtained by restoring a compressed image data file. The method comprises the steps of splitting the restored image data file into a low-frequency component and a component other than the low-frequency component; performing the image correction processes for the low-frequency component to obtain a corrected low-frequency component; and combining the corrected low-frequency component with the component other than the low-frequency component.

"The component other than the low-frequency component" is not limited to a single component. It may be, for example, a single high-frequency component, or a combination of two or more "high-frequency components" and "mid-frequency components".

The image correction process of the present invention may be either of a gradation, density, or white balance adjustment, or a combination thereof. Generally, the image quality degradation occurs most significantly when a gradation hardening operation is performed for an image data file. Application of the first image data processing method of the present invention to the gradation hardening operation for a restored image data file obtained by restoring a compressed image data file, therefore, may most effectively prevent the image quality degradation, such as block distortions.

A first image data processing apparatus of the present invention is an image data processing apparatus for performing image correction processes for a restored image data file obtained by restoring a compressed image data file. The apparatus comprises a splitting means for splitting the restored image data file into a low-frequency component and a component other than the low-frequency component; an image correction processing means for performing the image correction processes for the low-frequency component to obtain a corrected low-frequency component; and a combining means for combining the corrected low-frequency component with the component other than the low-frequency component.

A second image data processing method of the present invention is an image data processing method for implementing a gradation adjustment to a restored image data file obtained by restoring a compressed image data file. The method comprises the steps of determining whether to perform a gradation hardening operation or a gradation softening operation for the gradation adjustment, and performing gradation adjustment. The gradation hardening operation comprises the steps of splitting the restored image data file into a low-frequency component and a component other than the low-frequency component; performing the gradation hardening operation for the low-frequency component to obtain a gradation-corrected low-frequency component; and combining the gradation-corrected low-frequency component with the component other than the low-frequency component. The gradation softening operation comprises the step of performing a gradation softening operation over the entire portion of the restored image data file.

A second image data processing apparatus of the present invention is an image data processing apparatus for implementing a gradation adjustment to a restored image data file obtained by restoring a compressed image data file. The apparatus comprises a gradation adjustment type determining means for determining whether to perform a gradation hardening operation or a gradation softening operation for the gradation adjustment; a gradation hardening means for performing the gradation hardening operation, comprising a splitting means for splitting the restored image data file into a low-frequency component and a component other than the low-frequency component, a gradation hardening means for performing the gradation hardening operation for the low-frequency component to obtain a gradation-corrected low-frequency component, and a combining means for combining the gradation-corrected low-frequency component with the component other than the low-frequency component; and a gradation softening means for performing the gradation softening operation over the entire portion of the restored image data file.

The first image data processing method and apparatus of the present invention make use of the fact that human eyes are more sensitive to the area of a low frequency component than the areas other than the low frequency component of an image, and performs the image correction processes for a restored image data file obtained from a compressed image data file compressed by JPEG or other image data compression technologies by first splitting the restored image data file into a low-frequency component and a component other the low-frequency component; then performing the image correction processes such as a white balance, density, gradation, or other adjustments only to the low-frequency component, to which human eyes are most sensitive; and finally combining the corrected low-frequency component with the non-adjusted component that may include block distortion elements, so that the block distortion element may be suppressed and the processed image quality may be improved.

The second image data processing method and apparatus of the present invention take into account the fact that the gradation hardening operation may highlight block distortions, and performs the gradation hardening operation for a restored image data file by first splitting the restored image data file into a low-frequency component and a component other the low-frequency component, as in the first image data processing method and apparatus described above; then performing the gradation hardening operation only for the low-frequency component; and finally combining the gradation corrected low-frequency component with the other non-adjusted component. On the other hand, when performing a gradation softening operation for a restored image data file, the second image data processing method and apparatus of the present invention perform the gradation softening operation over the entire portion of the restored data. Thus, the image quality degradation due to highlighting of block distortions caused by the gradation hardening operation may be prevented, while the time required for the gradation softening operation that involves no highlighting of block distortions may be reduced by performing the operation over the entire portion of the image data without any splitting of frequency components.

BRIEF DESCRIPTIONS OF THE DRAWINGS

FIG. 1 is a block diagram showing the configuration of an image correction processing apparatus A according to a first embodiment of the present invention.

FIG. 2 is a drawing illustrating the operation of a sharpness adjusting section of the image correction processing apparatus A shown in FIG. 1.

FIG. 3 is a flow chart showing the operation of the image correction processing apparatus A shown in FIG. 1.

FIG. 4 is a block diagram showing the configuration of an image correction processing apparatus B according to a second embodiment of the present invention.

DESCRIPTION OF THE PREFERRED EMBODIMENTS

Hereinafter preferred embodiments of the present invention will be described with reference to the accompanying drawings.

FIG. 1 is a block diagram showing the configuration of an image correction processing apparatus A, which is an image data processing apparatus according to a first embodiment of the present invention. As shown in FIG. 1, the image processing apparatus A according to the first embodiment may be applied to a system that performs the image correction processes for an image data file obtained through, e.g., a digital camera by the user and outputs a printed image of the image data. The image correction processing apparatus A comprises a reading section 10 for reading a compressed image data file S0 from a storage medium 1; a restoring section 12 for restoring S0 to obtain a restored image data S1 (RGB image data); a splitting section 14 for splitting the restored image data S1 into a low-frequency component Sl and a high-frequency component Yh; a first image correction processing section 20 for implementing the white balance, density, and gradation adjustments to the low-frequency component Sl to obtain a corrected low-frequency component Sl3; an combining section 30 for combining the corrected low-frequency component Sl3 with the high-frequency component Yh; a sharpness adjusting section 34, which is a second image correction processing section; and a output section 36 for outputting an image data S5 obtained through a sharpness adjustment by the sharpness adjusting section 34 to an image reproducing device, such as a printer. The first image correction processing section 20 comprises a white balance adjusting section 22, a density adjusting section 24, and a gradation adjusting section 26, respectively for the white balance, density, and gradation adjustments.

The compressed data S0 has been obtained by photographing a subject through, for example, a digital camera and stored on a storage device 1, such as a memory card, as a JPEG-compressed data file.

The splitting section 14 splits the restored image data S1 (R1, G1, B1) into the low-frequency component Sl (Rl1, Gl1, Bl1) and the high-frequency component Yh in the following manner.

First, the splitting section 14 converts RGB values of the restored image data S1 to a luminance value Y1, and applies a low-pass filter thereto in accordance with the following Equations (1) and (2) to obtain an unsharp masking luminance value Y1us. Then, the splitting section 14 splits the restored image data S1 into the low-frequency component Sl (Rl, Gl, Bl) and the high-frequency component Yh in accordance with the Equation (3) shown below.

Formula 1:

$$Y_{us}(i, j) = \quad (1)$$

$$A\begin{pmatrix} Y_{1(i-2,j+2)} & Y_{1(i-1,j+2)} & Y_{1(i,j+2)} & Y_{1(i+1,j+2)} & Y_{1(i+2,j+2)} \\ Y_{1(i-2,j+1)} & Y_{1(i-1,j+1)} & Y_{1(i,j+1)} & Y_{1(i+1,j+1)} & Y_{1(i+2,j+1)} \\ Y_{1(i-2,j)} & Y_{1(i-1,j)} & Y_{1(i,j)} & Y_{1(i+1,j)} & Y_{1(i+2,j)} \\ Y_{1(i-2,j-1)} & Y_{1(i-1,j-1)} & Y_{1(i,j-1)} & Y_{1(i+1,j-1)} & Y_{1(i+2,j-1)} \\ Y_{1(i-2,j-2)} & Y_{1(i-1,j-2)} & Y_{1(i,j-2)} & Y_{1(i+1,j-2)} & Y_{1(i+2,j-2)} \end{pmatrix}$$

Where:
  Y1 is a luminance value
  $Y_{us}$ is an unsharp masking luminance value
  i, j indicate the pixel position in the coordinate
  A is a low-pass filter Formula 2:

$$A = \frac{1}{256}\begin{pmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{pmatrix} \quad (2)$$

Where:
  A is a low-pass filter

Formula 3:

$$Y_h(i,j) = Y_{1(i,j)} - Y_{us(i,j)}$$

$$R_l(i,j) = R_{1(i,j)} - Y_{h(i,j)}$$

$$G_l(i,j) = G_{1(i,j)} - Y_{h(i,j)}$$

$$B_l(i,j) = B_{1(i,j)} - Y_{h(i,j)} \quad (3)$$

Where:
  $Y_h$ is a luminance value of a high-frequency component
  $Y_1$ is a luminance value of restored image data S1
  $Y_{us}$ is an unsharp masking luminance value
  $R_l, G_l, B_l$ are R, G, B values of low-frequency component
  $R_1, G_1, B_1$ are R, G, B values of restored image data S1
  i, j indicate the pixel position in the coordinate The white balance adjusting section 22, density adjusting section 24, and gradation adjusting section 26, respectively for the white balance, density, and gradation adjustments, comprise the first image correction processing section 20. The operation of the respective sections will be described herein below.

The white balance adjusting section 22 calculates white balance offset values ΔR and ΔB in accordance with the Equation (4) shown below, and implements the adjustment to the low-frequency component Sl (Rl, Gl, Bl) by applying the white balance offset values ΔR and ΔB obtained to the Equation (5) shown below to obtain a white-balance-corrected image data Sl1 (Rl1, Gl1, Bl1)

Formula 4:

$$\Delta R = \frac{G_{Lav}}{R_{Lav}} \quad (4)$$

$$\Delta B = \frac{G_{Lav}}{R_{Lav}}$$

$$R_{Lav} = \sum_{i=1}^{n} \frac{R_{Li}}{n}$$

$$G_{Lav} = \sum_{i=1}^{n} \frac{G_{Li}}{n}$$

$$B_{Lav} = \sum_{i=1}^{n} \frac{B_{Li}}{n}$$

Where:
  ΔR, ΔB are white balance offsetting amounts
  $R_{li}, G_{li}, B_{li}$ are R, G, B values of a pixel in the low frequency component
  $R_{lav}$ is a mean R value of pixels in the low-frequency component $G_{lav}$ is a mean G value of pixels in the low-frequency component $B_{lav}$ is a mean B value of pixels in the low-frequency component n is the total number of pixels Formula 5:

$$R_{I1}=R\times\Delta R$$

$$G_{I1}=G_I$$

$$B_{I1}=B\times\Delta B \quad (5)$$

Where:

$R_{I1}$, $G_{I1}$, $B_{I1}$ are R, G, B values after white balance ajustment $R_I$, $G_I$, $B_I$ are R, G, B values before white balance adjustment $\Delta R$, $\Delta B$ are white balance offset values The density adjusting section 24 calculates an average value W1 of RGB values (hereinafter referred to as "RGB average value") for each pixel of the low-frequency component S1, obtains an density offset value $\Delta D$ for the low-frequency component in accordance with the Equation (6) shown below, and implements the density adjustment to the low-frequency component in accordance with the Equation (7) shown below to obtain a density-corrected image data S12 (Rl2, Gl2, Bl2).

Formula 6:

$$\Delta D = \frac{W_{mid}}{W_{Lav}} \quad (6)$$

$$W_{Lav} = \sum_{i=1}^{n} \frac{W_{Li}}{n}$$

Where:

$\Delta D$ is a density offset value $W_l$ is a RGB average value $W_{lav}$ is an averaged value of total numb of pixels for RGB average value n is the total number of pixels $W_{mid}$ is a constant Formula 7:

$$R_{I2}=R_{I1}\times\Delta D$$

$$G_{I2}=G_{I1}\times\Delta D$$

$$B_{I2}=B_{I1}\times\Delta D \quad (7)$$

Where:

$\Delta D$ is a density adjustment value $R_{I1}$, $G_{I1}$, $B_{I1}$ are R, G, B values before density adjustment $R_{I2}$, $G_{I2}$, $B_{I2}$ are R, G, B values after density adjustment The constant Wmid of the Equation (6) is a constant related to the bit count of an image data file, and may be 128 for an 8-bit image data file.

The gradation adjusting section 26 calculates a gradation adjustment scale γ by applying a contrast C of an image represented by the low-frequency component S1, which is a difference between the maximum and minimum RGB average values W1 of the pixels in the low-frequency component S1 obtained through the density adjusting section 24, and a predefined desirable contrast Cs to the Equation (8) shown below.

Formula 8:

$$\gamma=Cs/C \quad (8)$$

Where:

C is the contrast of an image represented by the low-frequency component.

Cs is a predefined desirable contrast.

Then, the gradation adjusting section 26 implements a gradation adjustment to each of the R, G, and B elements of the density-corrected image data Sl2 in accordance with the Equation (9) shown below to obtain a gradation-corrected low-frequency component Sl3.

Formula 9:

$$Rl3=\gamma\times(Rl2-Ys)+Ys$$

$$Gl3=\gamma\times(Gl2-Ys)+Ys$$

$$Bl3=\gamma\times(Bl2-Ys)+Ys \quad (9)$$

Where:

Ys is a reference luminance value.

The combining section 30 combines the corrected low-frequency component Sl3 obtained through the first image correction processing section 20 with the high-frequency component Yh obtained by the splitting section 14 to obtain an image data S4 (R4, G4, B4) in accordance with the Equation (10) shown below.

Formula 10:

$$R4=Rl3+Yh$$

$$G4=Gl3+Yh$$

$$B4=Bl3+Yh \quad (10)$$

The sharpness adjusting section 34 implements a sharpness adjustment to the image data S4 obtained through the combining section 30 to obtain an image data S5. Various sharpness adjustment systems are available, including a system that suppresses or emphasizes noise by acting on a predetermined spatial frequency component. The sharpness adjustment system normally includes a sharpness enhancement function for preventing blurring of an image profile as well as a function for preventing graininess (noise). The sharpness enhancement function improves the sharpness of an image, but at the same time, the graininess of the image is also enhanced, giving a rough, granular appearance. On the other hand, the function for preventing graininess provides reduced graininess of an image, giving a finer, smooth appearance, but at the same time, the sharpness of the image is also reduced. The sharpness adjusting section 34 of the image processing apparatus according to the first embodiment implements the sharpness adjustment by the use of a contrast dependent USM (unsharp masking) method that may control granularity and sharpness of an image independently. That is, the sharpness adjusting section 34 splits the frequency component of an image data file into a low-frequency component and a high-frequency component, then implements the sharpness adjustment to the high-frequency component in accordance with the contrast to control the granularity and the sharpness of an image independently. Generally, a grainy component has low contrast and an edge component has high contrast. Thus, the sharpness adjustment system using the contrast dependent USM method controls granularity and sharpness of an image independently by applying different highlighting levels for high-frequency component or sharpness gains to high and low contrast areas. Hereinafter, the operation of the sharpness adjusting section 34 will be described in detail.

First, the sharpness adjusting section 34 converts the RGB values of each pixel of the image data S4 obtained through the combining section 30 to a luminance value Y4, and applies a low-pass filter A' thereto in accordance with the Equation (11) shown below to obtain an unsharp masking luminance value Y4us.

Formula 11:

$$Y_{4us}(i, j) = A' \begin{pmatrix} Y_{4(i-1,j+1)} & Y_{4(i,j+1)} & Y_{4(i+1,j+1)} \\ Y_{4(i-1,j)} & Y_{4(i,j)} & Y_{4(i+1,j)} \\ Y_{4(i-1,j-1)} & Y_{4(i,j-1)} & Y_{4(i+1,j-1)} \end{pmatrix} \quad (11)$$

$$A' = \frac{1}{16} \begin{pmatrix} 1 & 2 & 1 \\ 2 & 4 & 2 \\ 1 & 2 & 1 \end{pmatrix}$$

Where:

Y is a luminance value $Y_{us}$ is an unsharp masking luminance value

Then, the sharpness adjusting section 34 calculates the difference between the Y4 and the unsharp masking luminance value Y4us (Y4−Y4us) for each pixel, which is defined as the contrast C of each pixel of the image data S4, determines a parameter of the sharpness adjustment or the sharpness gain based on the contrast C, and implements the sharpness adjustment to the image data S4 using the determined sharpness gain. As described above, the sharpness adjusting section 34 according to the first embodiment implements sharpness adjustment based on the contrast of the image data. First, as shown in FIG. 2, the sharpness adjusting section 34 determines the contrast-dependent sharpness gain α so that a fixed sharpness gain $α_l$ is applied to a low contrast area (an area having a contrast level equal to or less than a predefined low contrast threshold level), a fixed sharpness gain $α_h$ is applied to a high contrast area (an area having a contrast level equal to or higher than a predefined high contrast threshold level), and linearly varying sharpness gains α depending on the contrast C are applied to the intermediate contrast areas (areas having a contrast level between $C_l$ and $C_h$). Then, based on the determined sharpness gain, the sharpness adjusting section 34 implements the sharpness adjustment to the image data S4 in accordance with the Equation (12) shown below to obtain an image data S5 (R5, G5, B5).

Formula 12:

$$R5 = R4 + α × (Y4 - Y4us)$$

$$G5 = G4 + α × (Y4 - Y4us)$$

$$B5 = B4 + α × (Y4 - Y4us) \quad (12)$$

Where:

α is a sharpness gain

Y is a luminance value

Yus is an unsharp masking luminance value

FIG. 3 is a flow chart showing the operation of the image correction processing apparatus A according to the first embodiment. As shown in the FIG. 3, the apparatus reads a JPEG-compressed image data file S0 from a storage medium 1 through the reading section 10 (S2), and performs a restoring operation on the compressed data S0 to obtain the restored image data S1 through the restoring section 12 (S4). The splitting section splits the restored image data S1 into a low-frequency component S1 and a high-frequency component Yh (S6), and outputs them to the first image correction processing section 20 and the combining section 30 respectively. The first image correction processing section 20 implements the white balance, density, and gradation adjustments to the low-frequency component S1, and outputs the corrected low-frequency component Sl3 to the combining section 30 (S8). The combining section 30 combines the corrected low-frequency component Sl3 obtained through the first image correction processing section 20 with the high-frequency component Yh to obtain the image data S4 (S10). The sharpness adjusting section 34 implements the sharpness adjustment to obtain the image data S5 (S12). The image data S5 is outputted through the output section 36 to a printer and reproduced as a printed image (S14).

As described above, the image correction processing apparatus according to the first embodiment performs the image correction processes for a restored image data file by restoring a compressed image data file by first splitting the restored image data S1 into a low-frequency component S1 and a high-frequency component Yh, then implementing the white balance, density, and gradation adjustments to the low-frequency component S1 to obtain a corrected low-frequency component Sl3, and finally combining the corrected low-frequency component Sl3 with the high-frequency component Yh to obtain the image data S4. This means that the image correction processes including the white balance, density, gradation, and other adjustments are implemented only to the low-frequency component, keeping the high-frequency component that may include block distortion elements unadjusted so that the processed image quality may be improved and the block distortion elements may be suppressed.

FIG. 4 is a block diagram showing the configuration of an image correction processing apparatus B according to a second embodiment of the present invention. As shown in the FIG. 4, the image correction processing apparatus B according to the second embodiment may be applied to a system that implements a gradation adjustment to an image data file obtained through, e.g., a digital camera by the user and outputs a printed image of the image data. The image correction processing apparatus B comprises a reading section 50 for reading a compressed data file S0 from a storage medium 1; restoring section 52 for restoring S0 to obtain a restored image data S1 (RGB image data); a gradation adjustment type determining section 54 that determines whether to implement a gradation hardening operation or a gradation softening operation for the gradation adjustment, and outputs the restored image data S1 to a gradation hardening section 56, which will be described herein below, or to a gradation softening section 58, which will be described herein below, in accordance with the determined gradation adjustment type; the gradation hardening section 56 that performs a gradation hardening operation for the restored image data S1 to obtain an image data S6; the gradation softening section 58 that performs a gradation softening operation for the restored image data S1 to obtain an image data S7; and output section 60 that outputs the image data S6 obtained through the gradation hardening section 56, or the image data S7 obtained through the gradation softening section 58 to a printer.

The gradation adjustment type determining section 54 determines the gradation adjustment type based on the overall contrast of the restored image data S1. First, the gradation adjustment type determining section 54 converts the RGB values of each pixel of the restored image data S1 to a luminance value Y1, and calculates the difference between the maximum and minimum Y1s, which is defined as the overall contrast of the restored image data S1. When the overall contrast of the restored image data S1 is equal to or exceeds a predefined threshold level, i.e., the restored image data S1 is an image data having excessively high contrast, it is desirable to implement a gradation adjustment for more finely or softly graded tones, and, therefore, the gradation softening operation is performed. On the other hand, when the overall contrast of the restored image data S1 is less than a predefined threshold level, i.e., the restored image data S1 is an image data having excessively low contrast, it is desirable to implement a gradation adjustment for more coarsely or sharply graded tones, and, therefore, the gradation hardening operation is performed.

The restored image data S1 which is determined to be subjected to the gradation softening operation is outputted to the gradation softening section 58. The gradation softening section 58 performs a gradation softening operation that will result in reduced contrast over the entire restored image data S1, and outputs it to the output section 60.

On the other hand, the restored image data S1 which is determined to be subjected to the gradation hardening operation is outputted to the gradation hardening section 56. The gradation hardening section 56 splits the restored image data S1 into a low-frequency component and a high-frequency component, performs a gradation hardening operation that will result in increased contrast only to the low-frequency component to obtain a gradation-corrected low-frequency component, and combines the gradation-corrected low-frequency component with the non-adjusted high-frequency component, which is outputted to the output section 60. The operation of the gradation hardening section 56 for splitting the restored image data S1 into a low-frequency component and a high-frequency component, performing the gradation hardening operation, and combining the low-frequency component with the high-frequency component is identical respectively to that of the splitting section 14, gradation adjusting section 26, and combining section 30 of the image correction processing apparatus A according to the first embodiment described above and is not elaborated further here.

To sum up, the image correction processing apparatus B according to the second embodiment implements the gradation adjustment to a restored image data file by first determining the gradation adjustment type to be implemented to the restored image data file. Then, if the gradation softening operation is specified to be implemented by the gradation adjustment type determining step, it will conduct a gradation adjustment which will result in reduced contrast directly to the restored image data file without splitting the data based on the fact that the gradation softening operation does not bring about any highlighting of block distortions or other adverse effects, and only when the gradation hardening operation is specified to be implemented by the gradation adjustment type determining step, it will split the restored image data file into a low-frequency component and a high-frequency component, perform the gradation hardening operation only for the low-frequency component, and combine the gradation-corrected low-frequency component with the non-corrected high-frequency component. Thus, the image correction processing apparatus B according to the second embodiment may provide similar advantages to those provided by the image correction processing apparatus A according to the first embodiment. In addition, it may also reduce the time required for the gradation softening operation since it involves no data splitting and combining operations.

The image data processing apparatus according to the present invention has been described with reference to the specific preferred embodiments, but the present invention is not limited to the aforementioned embodiments. It will be evident that various modifications and additions, including the manner of the operation of the respective sections and the processing order, may be made without departing from the sprit and scope of the invention.

For example, the image correction processing apparatus A implements the gradation, white balance, and density adjustments to the restored data S1 as described above, but the apparatus may be configured to implement only a single adjustment or any two combinations thereof.

The image correction processing apparatus A implements the sharpness adjustment to the image data S4 obtained through the combining section 30. This configuration employs two different low-pass filters, one in the splitting section 14 (low-pass filter A) and the other in the sharpness adjusting section 34 (low-pass filter A') to obtain two different bands of high-frequency components to allow more precise sharpness adjustment. However, it may also be possible, for example, to implement the sharpness adjustment to the high-frequency component obtained through the splitting section 14, and then combine the sharpness-corrected high-frequency component with the image data obtained through the first image correction processing section 20 (the low-frequency component processed by the first image correction processing section 20). In that case, there will be no need to obtain two different bands of high-frequency components to implement the sharpness adjustment so that the time required for the sharpness adjustment may be reduced.

Further, the image correction processing apparatuses A and B according to the aforementioned embodiments use a low-pass filter to obtain a high-frequency component. But the filter may be of any kind that may effectively cut off block distortions, etc., such as a low-pass filter with a different filtering element size, or a median filter known as the smoothing filter capable of preserving edge portions.

Further, the aforementioned embodiments uses a JPEG-compressed data file as the compressed image data file, but the image data processing apparatuses according to the present invention may also perform image correction processes for a restored image data file obtained by restoring a compressed image data file compressed by the image data compression technologies other than JPEG.

Still further, the image data processing apparatuses according to the embodiments described above are applied to a system that outputs the processed image data to a printer, but they may also be applied to the system that recompresses the processed image data for transmission to other locations through a network or networks, or for storage in a storage device such as a hard disk.

Of course, the image data processing apparatuses according to the present invention may also be applied to a system that performs image correction processes for a compressed image data file received through a network or networks.

What is claimed is:

1. An image data processing method for implementing a gradation adjustment to a restored image data file obtained by restoring a compressed image data file comprising the steps of:
    determining whether to perform a gradation hardening operation or a gradation softening operation for said gradation adjustment; and
    performing said gradation adjustment; wherein
    said gradation hardening operation comprises the steps of
        splitting said restored image data file into a low-frequency component and a component other than said low-frequency component; performing said gradation hardening operation for said low-frequency component to obtain a gradation-corrected low-frequency component; and combining said gradation-corrected low-frequency component with the component other than said low-frequency component; and said gradation softening operation comprises the step of performing said gradation softening operation over the entire portion of said restored image data file.

2. An image data processing apparatus for implementing a gradation adjustment to a restored image data file obtained by restoring a compressed image data file comprising:

a gradation adjustment type determining means for determining whether to perform a gradation hardening operation or a gradation softening operation for said gradation adjustment;

a gradation hardening means for performing said gradation hardening operation, comprising a splitting means for splitting said restored image data file into a low-frequency component and a component other than said low-frequency component, a gradation hardening means for performing said gradation hardening operation for said low-frequency component to obtain a gradation-corrected low-frequency component, and a combining means for combining said gradation-corrected low-frequency component with the component other than said low-frequency component; and a gradation softening means for performing said gradation softening operation over the entire portion of said restored image data file.

3. The method of claim 2 comprising means for restoring a compressed image data file, and wherein the gradation softening means produces a reduced contrast directly to the restored compressed image data without frequency division, and wherein the gradation hardening means increases a contrast in the low frequency component only.

4. The method of claim 3, wherein determining whether to perform gradation hardening includes a contrast analysis over an entire image and if the contrast analysis exceeds a predetermined threshold, applying the gradation hardening in the low frequency component only.

* * * * *